(12) United States Patent
Stone et al.

(10) Patent No.: US 9,730,077 B2
(45) Date of Patent: Aug. 8, 2017

(54) ARCHITECTURE FOR SIMULTANEOUS SPECTRUM USAGE BY AIR-TO-GROUND AND TERRESTRIAL NETWORKS

(71) Applicant: SMARTSKY NETWORKS LLC, Charlotte, NC (US)

(72) Inventors: Ryan M. Stone, Charlotte, NC (US); Douglas Hyslop, Vienna, VA (US)

(73) Assignee: SMARTSKY NETWORKS LLC, Charlotte, NC (US)

( * ) Notice: Subject to any disclaimer, the term of this patent is extended or adjusted under 35 U.S.C. 154(b) by 0 days.

(21) Appl. No.: 15/287,914

(22) Filed: Oct. 7, 2016

(65) Prior Publication Data

US 2017/0026849 A1 Jan. 26, 2017

Related U.S. Application Data

(63) Continuation of application No. 14/595,512, filed on Jan. 13, 2015, now Pat. No. 9,491,635.

(51) Int. Cl.
*H04W 16/14* (2009.01)
*H04B 7/185* (2006.01)
(Continued)

(52) U.S. Cl.
CPC ........ *H04W 16/14* (2013.01); *H04B 7/18504* (2013.01); *H04B 7/18506* (2013.01);
(Continued)

(58) Field of Classification Search
CPC ..... H04W 16/14; H04W 16/28; H04W 24/02; H04W 88/08; H04B 7/18504
(Continued)

(56) References Cited

U.S. PATENT DOCUMENTS 8,410,975 B1  4/2013  Bell et al.
8,477,062 B1  7/2013  Kanellis
(Continued)

OTHER PUBLICATIONS

ETSI Technical Committee Electromagnetic Compatibility and Radio Spectrum Matters (ERM), "Electromagnetic Compatibility and Radio Spectrum Matters (ERM); System Reference Document (SRdoc); Broadband Direct-Air-To-Ground Communications System Employing Beamforming Antennas, Operating in the 2, 4 GHz and 5.8 GHz Bands," European Telecommunications Standards Institute, Jul. 2012, ETSI TR 101 599 V1.1.1.

*Primary Examiner* — Cong Tran
(74) *Attorney, Agent, or Firm* — McNair Law Firm, P.A.

(57) ABSTRACT

A network for providing air-to-ground (ATG) wireless communication in various cells may include an in-flight aircraft including an antenna assembly, a plurality of ATG base stations, a plurality of terrestrial base stations. Each of the ATG base stations defines a corresponding radiation pattern, and the ATG base stations are spaced apart from each other to define at least partially overlapping coverage areas to communicate with the antenna assembly in an ATG communication layer defined between a first altitude and a second altitude. The terrestrial base stations are configured to communicate primarily in a ground communication layer below the first altitude. The terrestrial base stations and the ATG base stations are each configured to communicate using the same radio frequency (RF) spectrum in the ground communication layer and ATG communication layer, respectively.

19 Claims, 10 Drawing Sheets

(51) Int. Cl.
*H04W 16/28* (2009.01)
*H04W 24/02* (2009.01)
H04W 88/08 (2009.01)
H04W 84/06 (2009.01)

(52) U.S. Cl.
CPC ........... *H04W 16/28* (2013.01); *H04W 24/02* (2013.01); *H04B 7/18508* (2013.01); *H04W 84/06* (2013.01); *H04W 88/08* (2013.01)

(58) Field of Classification Search
USPC ... 455/453, 454, 442, 12.1, 13.1, 431, 456.1
See application file for complete search history.

(56) References Cited

U.S. PATENT DOCUMENTS

| | | |
|---|---|---|
| 8,681,021 B1 | 3/2014 | Carrico |
| 9,014,704 B2 | 4/2015 | Hyslop |
| 9,143,807 B2 * | 9/2015 | Keen |
| 2006/0040660 A1 * | 2/2006 | Cruz ................ H04B 7/18506 455/431 |
| 2006/0229076 A1 | 10/2006 | Monk |
| 2010/0066616 A1 | 3/2010 | Brady, Jr. |
| 2010/0189089 A1 | 7/2010 | Lynch et al. |
| 2013/0182790 A1 * | 7/2013 | Jalali ....................... H01Q 3/24 375/285 |

\* cited by examiner

ARCHITECTURE FOR SIMULTANEOUS SPECTRUM USAGE BY AIR-TO-GROUND AND TERRESTRIAL NETWORKS

CROSS-REFERENCE TO RELATED APPLICATIONS

This application is a continuation of U.S. application Ser. No. 14/595,512 filed Jan. 13, 2015, the entire contents of which are hereby incorporated herein by reference.

TECHNICAL FIELD

Example embodiments generally relate to wireless communications and, more particularly, relate to techniques for enabling dual usage of spectrum by wireless air-to-ground (ATG) networks and terrestrial networks in the same geographic area.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, one prospect that may be considered is the dedication of some amount of radio frequency (RF) spectrum to in-flight communication. However, RF spectrum is extremely expensive due to the massive demands on this relatively limited resource. Accordingly, alternatives to the exclusive designation of a portion of RF spectrum to in-flight communication may be of interest.

BRIEF SUMMARY OF SOME EXAMPLES

The continuous advancement of wireless technologies offers new opportunities to provide wireless coverage for aircraft in-flight without dedicating RF spectrum to such coverage. In this regard, for example, by employing various interference mitigation strategies, spectrum reuse may be employed. Some example embodiments may provide interference mitigation techniques that may allow spectrum reuse within a given area so that both terrestrial networks and air-to-ground (ATG) networks can coexist in the same geographical area and employ the same spectrum.

In one example embodiment, a network for providing air-to-ground (ATG) wireless communication in various communication volumes or cells is provided. The network may include an in-flight aircraft including an antenna assembly, a plurality of ATG base stations, and a plurality of terrestrial base stations. Each of the ATG base stations defines a corresponding radiation pattern, and the ATG base stations are spaced apart from each other to define at least partially overlapping coverage areas to communicate with the antenna assembly in an ATG communication layer defined between a first altitude and a second altitude. The terrestrial base stations are configured to communicate primarily in a ground communication layer below the first altitude to provide services independently of or in cooperation with the ATG base stations. The terrestrial base stations and the ATG base stations are each configured to communicate using the same radio frequency (RF) spectrum in the ground communication layer and ATG communication layer, respectively.

In another example embodiment, a method of selecting antenna elements of an antenna assembly for communicating in an ATG network and compensating for aircraft movement (e.g., pitch and roll) is provided. The method may include determining an expected relative position of an ATG base station relative to an in-flight aircraft, selecting an antenna element to employ for communication with the ATG base station based on the expected relative position, receiving an indication of a change to the dynamic position information (e.g., where the change is indicative of at least a change in the pitch or roll of the aircraft), and adjusting the selected antenna element to compensate for the change to the dynamic position information.

In another example embodiment, an antenna assembly for an aircraft is provided. The antenna assembly may be capable of communicating with ATG base stations of an ATG wireless communication network. The antenna assembly may include a plurality of antenna elements, at least one of which is tiltable to maintain the antenna assembly oriented toward a focus region responsive to in-flight maneuvering of the aircraft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
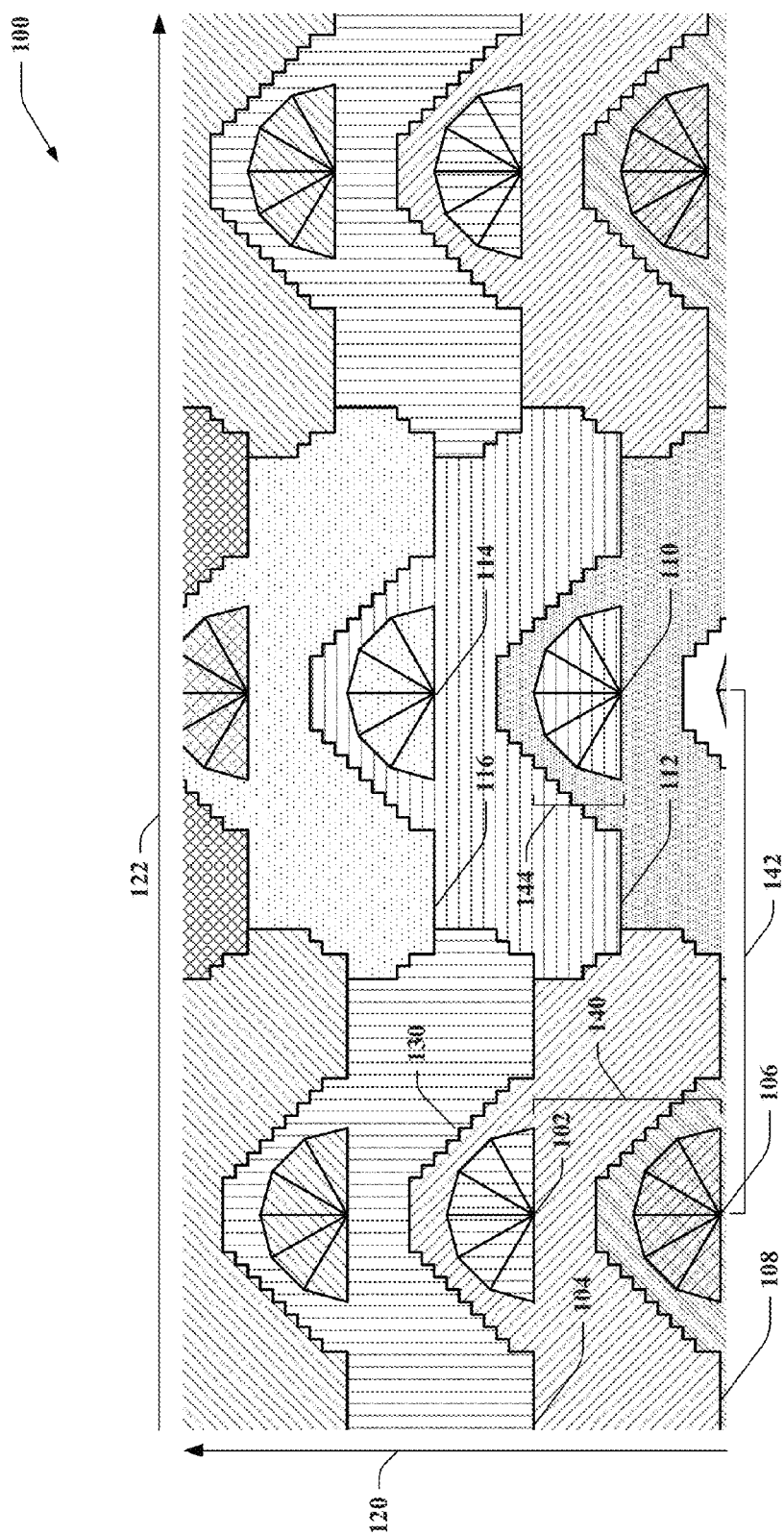
FIG. 1 illustrates a top view of an example network deployment providing air-to-ground (ATG) wireless communication coverage areas in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

Some example embodiments described herein provide architectures for improved air-to-ground (ATG) wireless communication performance. In this regard, some example embodiments may provide for the use of base stations on the ground having antenna structures configured to generate a wedge-shaped cell inside which directional beams may be focused. The wedge shaped cells may be spaced apart from each other and arranged to overlap each other in altitude bands to provide coverage over a wide area and up to the cruising altitudes of in-flight aircraft. The wedge shaped cells may therefore form overlapping wedges that extend out toward and just above the horizon. Thus, the size of the wedge shaped cells is characterized by increasing altitude band width (or increasing vertical span in altitude) as distance from the base station increases. Meanwhile, the in-flight aircraft may employ antennas that are capable of focusing toward the horizon and just below the horizon such that the aircraft generally communicate with distant base stations instead of base stations that may be immediately below or otherwise proximal (e.g., nearest) the aircraft. In fact, for example, an aircraft directly above a base station would instead be served by a more distant base station as the aircraft antennas focus near the horizon, and the base station antennas focus above the horizon. This leaves the aircraft essentially unaffected by the communication transmitters that may be immediately below the aircraft. Thus, for example, the same RF spectrum, and even the same specific frequencies the aircraft is using to communicate with a distally located base station may be reused by terrestrial networks immediately below the aircraft. As a result, spectrum reuse can be practiced relative to terrestrial wireless communication networks and ATG wireless communication networks in the same geographic area.

A plurality of base stations may be distributed to provide a corresponding plurality of adjacent wedge shaped cell coverage areas. Each wedge shaped cell may define a coverage area that extends between an upper and lower altitude limit and the upper and lower altitude limits may increase (substantially linearly) as distance from the transmitters forming the wedge shaped cell increases. Thus, the coverage areas may be defined between altitude bands that increase in size and altitude as they proceed away from the transmission site. A plurality of sectors within each wedge shaped cell may combine to form the wedge shaped cell. In some cases, six sectors may be employed to cover about 30 degrees each for a total of 180 degrees of azimuth coverage provided by each wedge shaped cell. The cell coverage area may therefore be substantially semicircular in the horizontal plane, and can be provided by multiple antennas each providing a wedge shaped sector over corresponding portions of the semicircular azimuth. The base stations can be deployed as substantially aligned in a first direction while offset in a second direction. For example, the base stations can also be deployed in the first direction at a first distance to provide coverage overlapping in elevation to achieve coverage over the predetermined altitude, and within a second distance in the second direction based on an achievable coverage area distance of the sectors. In some embodiments, any number of sectors may be employed for as much as 360 degrees of coverage.

FIG. 1 illustrates a top view of a network 100 of deployed base stations for providing ATG wireless communication coverage as described above. Network 100 includes various base stations providing substantially semicircular cell coverage areas. The cell coverage areas are each depicted in two portions. For example, the cell coverage area for a first base station is shown as similarly patterned portions 102 and 104. The portions 102 and 104 represent a single continuous cell coverage area over a horizontal plane; however, FIG. 1 depicts intervening portion 108 of another cell coverage area as providing overlapping coverage to achieve continuous coverage up to a predetermined altitude, as described further herein. Portion 102 is shown to represent the initial cell coverage area from the location of the corresponding base station out to an arbitrary distance for illustrative purposes; it is to be appreciated that this portion 102 also includes the overlapping coverage of portion 108 of another cell coverage area to achieve coverage at the predetermined altitude. Moreover, the coverage area represented by portions 106 and 108 may extend beyond boundary 130 of coverage area portion 104; the coverage areas are limited in the depiction to illustrate at least one point where the bordering coverage areas are able to provide ATG wireless communication coverage at the predetermined altitude. Further, the base stations are not depicted for ease of explanation, but it is to be appreciated that the base stations can be located such to provide the cell coverage area indicated by portions 102 and 104, portions 106 and 108, portions 110 and 112, etc.

The cell coverage areas 102/104 and 106/108 can be provided by respective base stations in a first base station array, where the base stations of one or more base station arrays are substantially aligned in a first direction 120 (as depicted by the representative cell coverage areas). As shown, cell coverage areas 102/104 and 106/108 project a directional radiation pattern that is oriented in the first direction, and are aligned front to back along the first direction. Such alignment can be achieved by substantially aligning base stations in the base station array to provide the substantially aligned cell coverage areas, antenna rotation to achieve alignment in the cell coverage areas in the first direction 120, and/or the like. As described, in this regard, a first base station that provides cell coverage area 102/104 can be overlapped by at least a cell coverage area 106/108 of a second base station in front of the first base station in the first direction 120. For example, a base station, or antennas thereof, can provide wedge shaped cell coverage areas defined by multiple elevation angles employed by antennas transmitting signals to achieve a predetermined altitude by a certain distance from the base station. Thus, overlapping the cell coverage areas in the first direction 120 allows cell coverage area 106/108 to achieve the predetermined altitude for at least the certain distance between the base station providing cell coverage area 102/104 and a point along line 130 where the cell coverage area 102/104 achieves the predetermined altitude.

In addition, base stations in the first base station array providing cell coverage areas 102/104 and 106/108 can be spaced apart (i.e., located at random, fixed or predetermined intervals) in a second direction 122 from base stations of a second base station array, which can provide additional cell coverage areas 110/112, 114/116, etc., aligned in the first direction 120. The first and second base station arrays can extend substantially parallel to each other in the first direction 120. In addition, base stations of the second base station array can be offset from base stations of the first base station array in the first direction 120 (as depicted by the representative cell coverage areas). The second direction 122 can be substantially perpendicular to the first direction 120 in one example. In this example, the first and second base station arrays can be offset to provide the offsetting of respective cell coverage areas (e.g., the offset shown between cell coverage areas 102/104 and 110/112), and any other coverage areas of the base station arrays aligned in the first direction 120.

The first and second base station arrays can be spaced apart at a greater distance in the second direction 122 than base stations within the respective arrays spaced apart in the first direction 120. For example, the base stations can be spaced in the second direction 122 according to an achievable coverage distance of the base station providing the cell coverage areas. Because the base stations providing cell coverage areas 102/104 and 106/108 in the first base station array are aligned in the first direction 120 such that cell coverage area 106/108 provides overlapping coverage to cell coverage area 102/104 to achieve the predetermined altitude, the base station arrays themselves can be separated based on the achievable distance of the respective cell coverage areas 102/104 and 110/112. In this regard, no substantial overlapping is needed between the boundaries of cell coverage areas 102/104 and 110/112 provided by base stations of adjacent base station arrays to reach the predetermined altitude since the altitude deficiencies near the respective base stations are covered by cell coverage areas of base stations in the base station array aligned in the first direction 120.

Moreover, offsetting the base stations providing the various cell coverage areas over the second direction 122 can allow for further spacing in the first direction 120 and/or second direction 122 as the end portions of one cell coverage area in the horizontal plane can abut to a middle portion of another cell coverage area from a base station in an adjacent base station array to maximize the distance allowed between the cell coverage areas while maintaining continuous coverage, which can lower the number of base stations necessary to provide coverage over a given area. In one example, the spacing in the second direction 122 can be more than twice the spacing in the first direction 120, depending on the coverage distance of the cell coverage areas and the distance over which it takes a cell coverage area to reach the predetermined altitude.

As depicted, the spacing of a first distance between base stations in a given base station array can be indicated as distance 140 in the first direction 120. The spacing of a second distance between base station arrays in the second direction 122 can be indicated as distance 142. Moreover, the offset between the base station arrays can be indicated as a third distance 144. In one specific example, the distance 140 can be near 100 kilometers (km), where distance 142 between the base stations providing cell coverage area 102/104 can be 300 km or more. In this example, the achievable cell coverage areas can be at least 200 km from the corresponding base station in the direction of the transmitted signals that form the coverage areas or related sectors thereof, as a slant distance from a base station within one array to the intersecting coverage from a base station in the second array. Moreover, in this example, the distance 144 can be around 75 km.

In an example, the base stations providing cell coverage areas 102/104, 106/108, 110/112, etc. can each include respective antenna arrays defining a directional radiation pattern oriented in the first direction. The respective antenna arrays can include multiple antennas providing a sector portion of the radiation pattern resulting in a coverage area that is wedge shaped in the vertical plane. For example, the cell coverage area provided by each antenna can have first and second elevation angles that exhibit an increasing vertical beam width, or span, in the vertical plane, and fills a portion of an azimuth in the horizontal plane. Using more concentrated signals that provide smaller portions of the azimuth can allow for achieving further distance and/or increased elevation angles without increasing transmission power. In the depicted example, the cell coverage areas defined by the antenna arrays include six substantially 30 degree azimuth sectors that are substantially adjacent to form a directional radiation pattern extending substantially 180 degrees in azimuth centered on the first direction to define the semicircular coverage area. Each sector can be provided by an antenna at the corresponding base station, for example. Moreover, in one example, the base station can have a radio per antenna, a less number of radios with one or more switches to switch between the antennas to conserve radio resources, and/or the like, as described further herein. It is to be appreciated that additional or a less number of sectors can be provided. In addition, the sectors can have an azimuth more or less than 30 degrees and/or can form a larger or smaller total cell coverage area azimuth than the depicted semicircular cell coverage area.

In yet other examples, the network 100 can implement frequency reuse of one, three, four, seven, or other suitable configurations (e.g., using formula $N=i^2+j^2+ij$ where i=# cells over from the original cell and j=# cells down from the original cell) such that nearby base stations can use the same channels in providing the cell coverage areas. For example, a base station providing cell coverage areas 102/104 can use a first channel, a base station providing cell coverage area 106/108 in the same base station array can use a second channel, and a base station providing cell coverage area 114/116 can use a third channel. Similarly, an adjacent group of three base stations providing cell coverage areas in a different base station array can use the same channels, etc. It is to be appreciated that other frequency reuse patterns and/or number of reuse factors can be utilized in this scheme to provide frequency diversity between adjacent cell coverage areas.

In a further example, a non-traditional frequency reuse scheme of two may be employed by the system. The wedge shape of the base station coverage areas in combination with the directional aircraft antennas effectively achieve a reuse of four with only two channel sets. In this example, an array of base stations alternate channel assignment between two channels in the array, with Channel A on a first base station, Channel B on a second base station, Channel A on a third, etc. The second array similarly alternates between the two channels, with Channel A offset from the similar Channel A base station in the first array. The overlap area between the two arrays will occasionally present the same co-channel frequency within the overlap area, but the angular directions of arrival from the two co-channel base stations are sufficiently distinct such that the aircraft antenna will focus on the closer base station, resulting in an aircraft antenna null in the direction of the second, weaker base station. Thus, a non-traditional frequency reuse is achieved through the design of the wedge-shaped base station coverage and the design of the directional aircraft antennas.

Furthermore, in an example deployment of network 100, the first direction 120 and/or second direction 122 can be, or be near, a cardinal direction (e.g., north, south, east, or west), an intermediate direction (e.g., northeast, northwest, southeast, southwest, north-northeast, east-northeast, etc.), and/or the like on a horizontal plane. In addition, the network 100 can be deployed within boundaries of a country, boundaries of an air corridor across one or more countries, and/or the like. In one example, cell coverage area 106/108 can be provided by an initial base station at a border of a country or air corridor. In this example, a base station providing cell coverage area 106/108, 110/112, and/or additional cell coverage areas at the border, can include one or more patch antennas to provide coverage at the predetermined altitude from the distance between the base station to the point where the respective cell coverage area 106/108, 110/112, etc. reaches the predetermined altitude. For example, the one or more patch antennas can be present behind the cell coverage areas 106/108, 110/112, etc., and/or on the base stations thereof (e.g., as one or more antennas angled at an uptilt and/or parallel to the horizon) to provide cell coverage up to the predetermined altitude.

Figure 2:
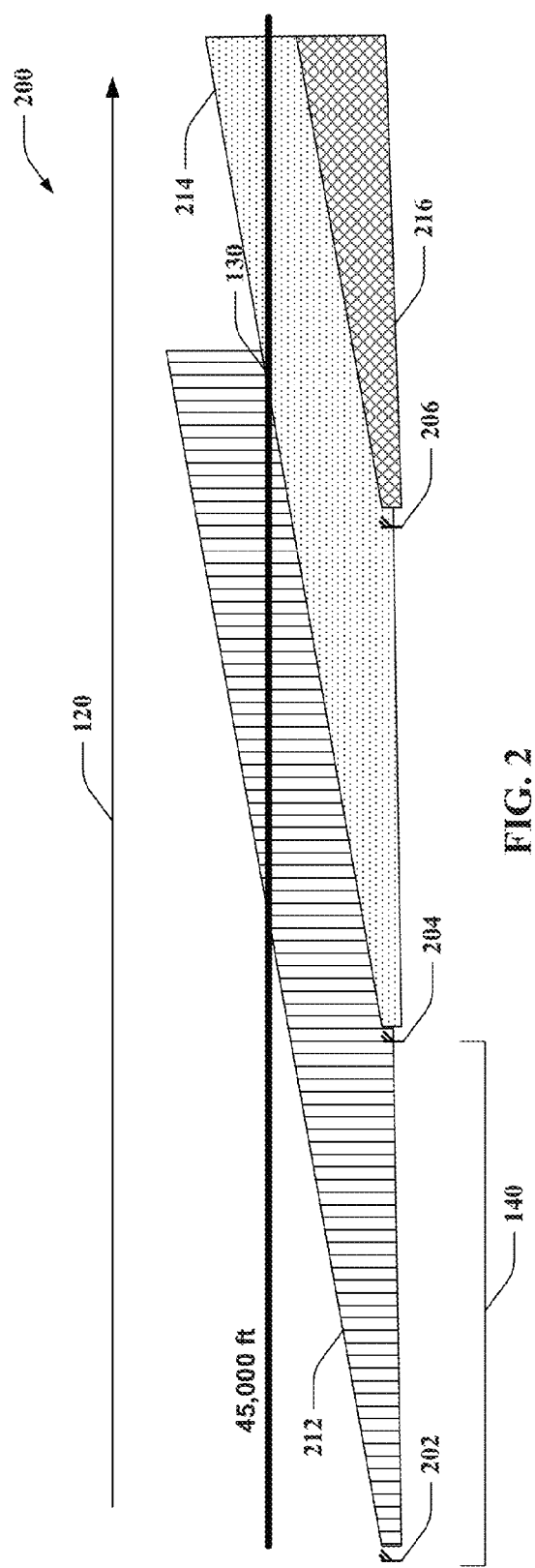
FIG. 2 illustrates an aspect of an example network deployment of base stations providing overlapping cell coverage areas to achieve coverage up to a predetermined altitude in accordance with an example embodiment.

FIG. 2 illustrates an example network 200 for providing overlapping cells (e.g., in the vertical direction) to facilitate ATG wireless communication coverage at least at a predetermined altitude. Network 200 includes base stations 202, 204, and 206 that transmit signals for providing the ATG wireless communications. Base stations 202, 204, and 206 can each transmit signals that exhibit a radiation pattern defined by a first and second elevation angle such to achieve a predetermined altitude. In this example, base stations 202, 204, and 206 provide respective wedge shaped cell coverage areas 212, 214, and 216 that are offset in origin and overlap in the vertical direction. The base stations 202, 204, and 206 can be deployed as substantially aligned in a first direction 120 as part of the same base station array, as described above, or to otherwise allow for aligning the cell coverage areas 212, 214, and 216 in the first direction, such that cell coverage area 212 can overlap cell coverage area 214 (and/or 216 at a different altitude range in the vertical plane), cell coverage area 214 can overlap cell coverage area 216, and so on. This can allow the cell coverage areas 212, 214, and 216 to achieve at least a predetermined altitude (e.g., 45,000 feet (ft)) for a distance defined by the various aligned base stations 202, 204, 206, etc.

As depicted, base station 202 can provide cell coverage area 212 that overlaps cell coverage area 214 of base station 204 to facilitate providing cell coverage up to 45,000 ft near base station 204 for a distance until signals transmitted by base station 204 reach the predetermined altitude of 45,000 ft (e.g., near point 130), in this example. In this example, base station 204 can be deployed at a position corresponding to the distance between which it takes cell coverage area 214 of base station 204 to reach the predetermined altitude subtracted from the achievable distance of cell coverage area 212 of base station 202. In this regard, there can be substantially any number of overlapping cell coverage areas of different base stations to reach the predetermined altitude based on the elevation angles, the distance it takes to achieve a vertical beam width at the predetermined altitude based on the elevation angles, the distance between the base stations, etc.

In one specific example, the base stations 202, 204, and 206 can be spaced apart by a first distance 140, as described. The first distance 140 can be substantially 100 km along the first direction 120, such that base station 204 is around 100 km from base station 202, and base station 206 is around 200 km from base station 202. Further, in an example, an aircraft flying between base station 206 and 204 may be covered by base station 202 depending on its altitude, and in one example, altitude can be used in determining whether and/or when to handover a device on the aircraft to another base station or cell provided by the base station to provide for uninterrupted handover of receivers on an aircraft.

Moreover, as described in some examples, base stations 202, 204 and 206 can include an antenna array providing a directional radiation pattern oriented along the first direction 120, as shown in FIG. 1, where the directional radiation pattern extends over a predetermined range in azimuth centered on the first direction 120, and extends between the first elevation angle and the second elevation angle of the respective coverage areas 212, 214, and 216 over at least a predetermined distance to define the substantially wedge shaped radiation pattern. In this regard, FIG. 2 depicts a side view of a vertical plane of the base stations 202, 204, and 206, and associated coverage areas 212, 214, and 216. Thus, in one example, base station 202 can provide a cell coverage area 212 that is similar to cell coverage area 106/108 in FIG. 1 in a horizontal plane, and base station 204 can provide a cell coverage area 214 similar to cell coverage area 102/104 in FIG. 1. Moreover, as described, direction 120 can correlate to a cardinal direction, intermediate direction, and/or the like. In addition, in a deployment of network 200, additional base stations can be provided in front of base station 206 along direction 120 until a desired coverage area is provided (e.g., until an edge of a border or air corridor is reached).

As mentioned above, the establishment of an ATG network with base stations deployed and configured in the manner described in FIGS. 1 and 2 provides the ability to create a layered approach to covering a given area, in which the layers define altitude bands in which distally located base stations provide coverage for aircraft with fore/aft and side looking antenna arrays that are essentially shielded from potentially interfering transmitters directly below them. Accordingly, for example, a bottom layer (i.e., closest to the ground) may reuse radio spectrum already employed in the altitude bands defined in the layer or layers above. Frequency reuse can therefore be employed for a given region in distinct altitude bands.

Figure 3:
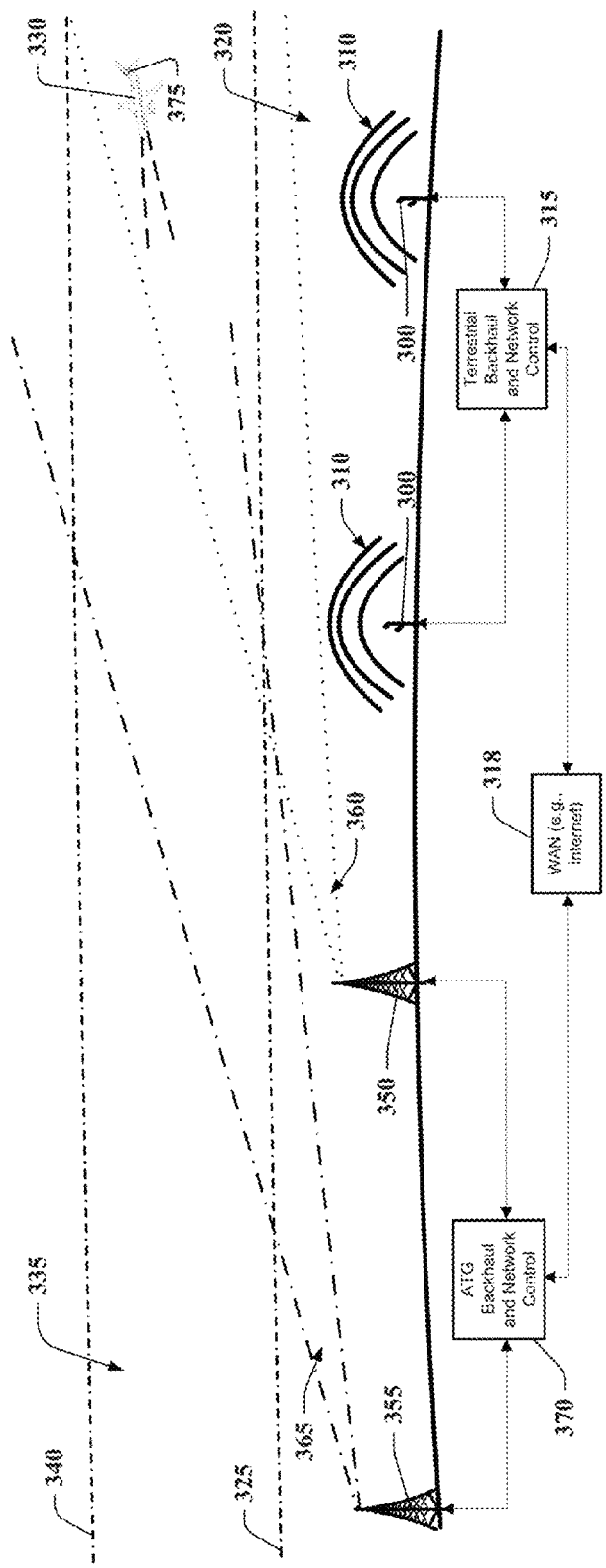
FIG. 3 illustrates a side view of a layered approach to providing wireless communication to in-flight aircraft while minimizing interference between the layers in accordance with an example embodiment.

FIG. 3 illustrates an example network architecture for providing overlapping cells with layered altitude bands to facilitate ATG wireless communication coverage with RF spectrum that can be reused by a terrestrial network. FIG. 3 shows only two dimensions (e.g., an X direction in the horizontal plane and a Z direction in the vertical plane), however it should be appreciated that the wedge architecture of the ATG network may be structured to extend coverage also in directions into and out of the page (i.e., in the Y direction). Although FIG. 3 is not drawn to scale, it should be appreciated that the wedge shaped cells generated by the base stations for the ATG portion of the network architecture are configured to have a much longer horizontal component than vertical component. In this regard, the wedge shaped cells may have a horizontal range on the order of dozens to nearly or more than 100 miles. Meanwhile, the vertical component expands with distance from the base stations, but is in any case typically less than about 8 miles (e.g., about 45,000 ft).

As shown in FIG. 3, a terrestrial network component of the architecture may include one or more terrestrial base stations 300. The terrestrial base stations 300 may generally transmit terrestrial network emissions 310 to serve various fixed or mobile communication nodes (e.g., UEs) and other wireless communication devices dispersed on the ground. The terrestrial base stations 300 may be operably coupled to terrestrial backhaul and network control components 315, which may coordinate and/or control operation of the terrestrial network. The terrestrial backhaul and network control components 315 may generally control allocation of RF spectrum and system resources, and provide routing and control services to enable the UEs and other wireless communication devices of the terrestrial network to communicate with each other and/or with a wide area network (WAN) such as the Internet.

The UEs of the terrestrial network may also transmit their own terrestrial network emissions, which may create the possibility for generation of a substantial amount of communication traffic in a ground communication layer 320 extending from the ground to a predetermined minimum altitude 325 above which only receivers on in-flight aircraft 330 are present. The in-flight aircraft 330 may operate in an ATG communication layer 335 that may extend from one or two miles in altitude up (e.g., the predetermined minimum altitude 325) to as far as about 8 miles in altitude (e.g., a predetermined maximum altitude 340). While, the predetermined minimum altitude 325 and predetermined maximum altitude 340 may bound a single ATG communication layer or, in the case where multiple ATG wedge shaped cells overlap, multiple ATG communication layers.

The architecture may also employ a first ATG base station 350 and a second ATG base station 355, which are examples of base stations employed as described in the examples of FIGS. 1 and 2. Thus, for example, the first ATG base station 350 may be deployed substantially in-line with the second ATG base station 355 along the X axis and may generate a first wedge shaped cell 360 that may be layered on top of a second wedge shaped cell 365 generated by the second ATG base station 355. When the in-flight aircraft 330 is exclusively in the first wedge shaped cell 360, the in-flight aircraft 330 may communicate with the first ATG base station 350 using assigned RF spectrum and when the in-flight aircraft 330 is exclusively in the second wedge shaped cell 365, the in-flight aircraft 330 may communicate with the second ATG base station 355 using assigned RF spectrum. An area of overlap between the first wedge shaped cell 360 and the second wedge shaped cell 365 may provide the opportunity for handover of the in-flight aircraft 330 between the first ATG base station 350 and the second ATG base station 355, respectively. Accordingly, uninterrupted handover of receivers on the in-flight aircraft 330 may be provided while passing between coverage areas of base stations having overlapping coverage areas as described herein.

In an example embodiment, ATG backhaul and network control components 370 may be operably coupled to the first and second ATG base stations 350 and 355. The ATG backhaul and network control components 370 may generally control allocation of RF spectrum and system resources, and provide routing and control services to enable the in-flight aircraft and any UEs and other wireless communication devices thereon to communicate with each other and/or with a wide area network (WAN) such as the Internet.

Given the curvature of the earth and the distances between base stations of the ATG network, the layering of the wedge shaped cells can be enhanced. Additionally, the first ATG base station 350 and the second ATG base station 355 may be configured to communicate with the in-flight aircraft 330 using relatively small, directed beams that are generated using beamforming techniques. The beamforming techniques employed may include the generation of relatively narrow and focused beams. Thus, the generation of side lobes (e.g., radiation emissions in directions other than in the direction of the main beam) that may cause interference with communications in the ground communication layer 320 may be reduced. In some cases, the terrestrial base stations 300, which are generally only required to transmit in a relatively narrow layer close to the ground, may also be configured to employ antennas and/or arrays that employ side lobe suppression techniques aimed at reducing the amount of potential interference transmitted out of the ground communication layer 320 and into the ATG communication layer 335.

Accordingly, the network architecture itself may help to reduce the amount of cross-layer interference. In this regard, the wedge shaped cell structure focuses energy just above the horizon and leaves a layer on the ground that is usable for terrestrial network operations without significant interference from the ATG base stations, and create a separate higher altitude layer for ATG network communications. Additionally, the use of directional antennas with beamsteering by the ATG base stations, and antennas with side lobe suppression, reduces the amount of interference across these layers. However, as will be described in greater detail below, since all of the equipment in the ATG communication layer 335 with which communication is desired will be on the in-flight aircraft 330, some embodiments may employ further interference mitigation techniques associated with the antenna assembly 375 provided on the in-flight aircraft 330. Accordingly, for example, the UEs or other wireless communication devices on or associated with the in-flight aircraft 330 may be communicatively coupled with the first ATG base station 350 or the second ATG base station 355 via the antenna assembly 375 of the in-flight aircraft 330. In this regard, for example, the antenna assembly 375 may be strategically mounted on the in-flight aircraft 330 and/or the antenna assembly 375 may be operated or controlled in a manner that facilitates interference mitigation as described in greater detail below.

By generally minimizing cross-layer interference, the same RF spectrum can be reused in both the ground communication layer 320 and the ATG communication layer 335. As such, the network architecture of an example embodiment may effectively act as a frequency spectrum doubler in that spectrum that is used in the terrestrial network may be reused by the ATG network with minimal interference therebetween. The base stations serving each respective layer may be distally located relative to each other such that, for example, a serving ATG base station in communication with the in-flight aircraft 330 is geographically located outside a coverage area of each of the terrestrial base stations in a portion of the ground communication layer 320 above which the in-flight aircraft 330 is located. The substantially horizontally focused nature of the ATG base stations (350 and 355) enables them to be positioned far outside of the region below which the in-flight aircraft 330 is located. The antenna assembly 375 can therefore "look" or otherwise focus its communication efforts away from potentially interfering sources directly below the in-flight aircraft 330.

As mentioned above, cross-layer interference mitigation may be accomplished on the in-flight aircraft 330 by strategic positioning of the antenna assembly 375. For example, when the antenna assembly 375 is positioned on a vertical stabilizer of the in-flight aircraft 330, the antenna assembly 375 may generally have a narrow aspect relative to the ground and any transmissions directed from the ground, while providing excellent control of the vertical antenna pattern. Additionally, for certain side mountings of the antenna assembly on the body of the in-flight aircraft 330, part of the airframe may shield the antenna assembly 375 from terrestrial network emissions 310 generated by terrestrial base stations 300 below the in-flight aircraft 330. Such shielding may be even more pronounced if, for example, the antenna assembly 375 is positioned on the top or roof of the in-flight aircraft 330. In these examples, the metal airframe of the in-flight aircraft 330 may act as an extended groundplane. The antenna assembly 375 in either (or both) of these locations may therefore have limited ability to receive transmissions that are not directed from locations with a substantially greater vertical component of distance from the in-flight aircraft 330 than the horizontal component of such distance. In other words, the antenna assembly 375 is shielded from transmitters that are not near the horizon. These locations (e.g., on sides or tops of aircraft) are therefore advantageous for further mitigating cross-layer interference. However, such locations may generally be better for communication with transmitters off to the side of the in-flight aircraft 330, rather than in front of or behind the in-flight aircraft 330. For better coverage in front of and behind the in-flight aircraft 330, positioning of the antenna assembly 375 (or portions or components of the antenna assembly 375) on the bottom of the in-flight aircraft 330 may be employed. Thus, fewer antenna elements (e.g., only those on the bottom of the in-flight aircraft 330) may need to have sophisticated side lobe suppression techniques employed thereon to facilitate reduction of cross-layer interference.

In accordance with the general strategic positioning of the antenna assembly 375 described above, the antenna assembly 375 can be shielded (at least partially) from cross-layer interference by avoiding exposure to transmitters below the in-flight aircraft 330. However, such strategy implies that the antenna assembly 375 should instead look to transmitters closer to the horizon. This horizon-focused paradigm actually fits quite well with the corresponding layered network architecture described above since the ATG base stations are generally configured to form wedge shaped cells that are focused just above the horizon. Thus, both the ground transmitters and the antenna assembly 375 of an example embodiment are mutually optimized for focusing substantially more energy in the horizontal plane than in the vertical plane. This enhances the ability to maximize spacing between ATG base stations (thereby reducing ATG base station count and network build cost), and simplifies the architecture of the antenna assembly 375 (since natural shielding of the airframe can be employed in some cases). As a result, corresponding ATG base stations focusing energy above the horizon and airborne antenna assemblies focusing energy just below the horizon are mutually optimized to communicate with each other with substantially less interference to worry about from terrestrial network base stations directly (or nearly directly) below the in-flight aircraft 330 even when the same spectrum used by the terrestrial network is reused by the ATG network.

Figure 4:
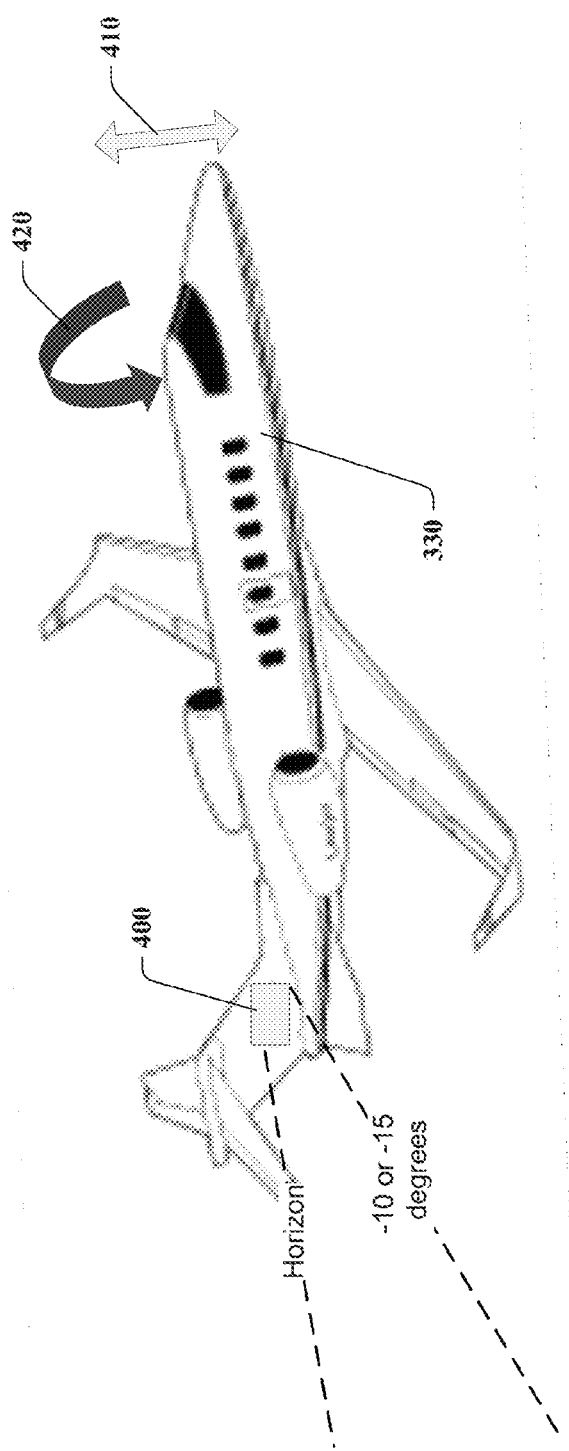
FIG. 4 illustrates a side panel element disposed on an in-flight aircraft in accordance with an example embodiment.

In an example embodiment, the antenna assembly 375 may be configured to focus energy in an area from the horizon to about 10 or 15 degrees below the horizon (from the perspective of the in-flight aircraft 330). FIG. 4 illustrates an example of the in-flight aircraft 330 having a side panel element 400 as a portion of the antenna assembly 375. The side panel element 400 is positioned on the vertical stabilizer, but could alternatively be positioned on a side, top, bottom or other portion of the aircraft. Of note, the side panel element 400 may, in some cases, be embodied in a form other than as a flat array (e.g., as a blade antenna element, a conformal array and/or the like). As can be appreciated from the example of FIG. 4, by focusing mainly on areas between the horizon and 10 or 15 degrees below the horizon, the subset of ATG base stations with which communication can be established is somewhat limited. Accordingly, the side panel element 400 may need to be stabilized for ensuring that it remains oriented toward the horizon and just below the horizon even when the aircraft pitches (i.e., moves its head up and down as shown by arrow 410) or rolls (i.e., turns side to side as shown by arrow 420).

In some cases, the amount of pitch and roll that the in-flight aircraft 330 may encounter may be limited based on certain restrictions that are dependent upon altitude, speed and passenger comfort. For example, pitch (i.e., the angle of ascent or descent) may be limited to about 7 degrees above 10,000 ft in altitude. Meanwhile, for example, roll (i.e., the angle of bank right or left during a turn) may be limited to less than 20 degrees above 10,000 ft in altitude and to less than 15 degrees above 20,000 ft in altitude. Accordingly, not only may it be desirable to provide compensation and/or stabilization of the antenna assembly 375 (e.g., the side panel element 400), but such compensation and/or stabilization may be dependent upon altitude or other environmental factors.

Figure 5:
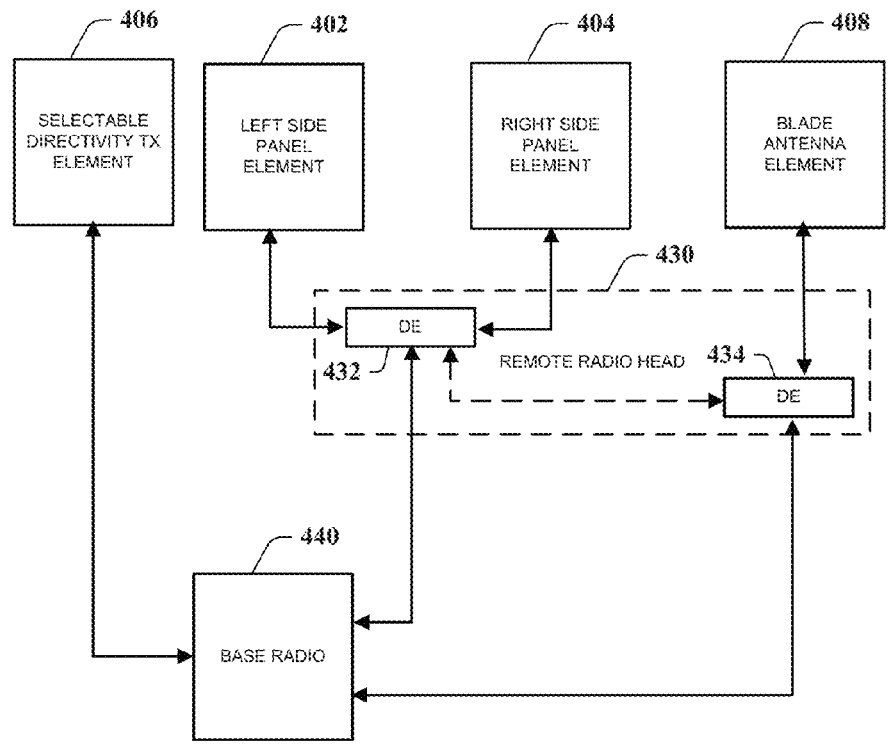
FIG. 5 illustrates a functional block diagram of antenna elements of an example embodiment.

In embodiments in which the antenna assembly 375 is embodied as or includes a panel antenna (e.g., side panel element 400), which may include a plurality of sector antennas. In some cases, the panel antenna may be mechanically and/or electrically steered or tilted to provide the compensation and/or stabilization described above. As such, the panel antenna may also be referred to as a steerable matrix antenna. FIG. 5 shows a block diagram of system components that may be employed in connection with controlling an antenna assembly of an example embodiment. As shown in FIG. 5, the antenna assembly 375 may include a left side panel element 402 and a right side panel element 404. The antenna assembly may also include one or more blade, monopole or other antenna elements such as antenna elements 406 and 408. In an example embodiment, element 408 may be a blade antenna configured for fore/aft reception. Meanwhile, the right and left side panel elements 404 and 402 may be receive elements for respective sides of the airplane. Antenna element 406 may be a blade antenna with four or more transmission elements, and may have selectable directivity. In some embodiments, such as for large airframes, the receive elements may optionally each be coupled to a remote radio head 430 via one or multiple cables. However, if no remote radio head is employed, the radio itself could perform functions described herein in association with the remote radio head. In some cases, the remote radio head 430 may be distributed in more than one physical location (as shown by distributed elements (DEs)

432 and 434. The remote radio head 430 may then be coupled (e.g., via fiber optic or other cables) to a base radio 440 at which typical modulation, demodulation and other radio functions are conducted. The transmit element 406 may also be coupled to the base radio 440.

In an example embodiment, the remote radio head 430 may provide for switching among the receive antennas. In examples in which vertical beam steering of the array panels is conducted, four or more cables may be used to connect each of the left side panel element 402 and the right side panel element 404 to the remote radio head 430. The remote radio head 430 may include one or more cavity filters corresponding to the number of antenna outputs provided to the remote radio head 430. In cases in which vertical beam steering is conducted with a mechanical device adjusting the electrical tilt of the arrays, only one cable and cavity filter, bulk acoustic wave (BAW) filter, surface acoustic wave (SAW) filter, circulator or any other suitable filter may be employed for each array. In some cases, the remote radio head 430 could be eliminated and filters, low noise amplifier (LNA) and switching components may be integrated into antenna housings or in other housings proximate to the antennas. Switching components (whether part of or external to the remote radio head 430) would be used to select the best antenna for receipt or transmission of any given signal based on location of the target or source, the signal strength of the ATG base stations, and the level of interference from surrounding base stations or terrestrial stations. The antenna selection, then, has multiple triggers designed to maximize the signal to interference plus noise ratio.

Figure 6:
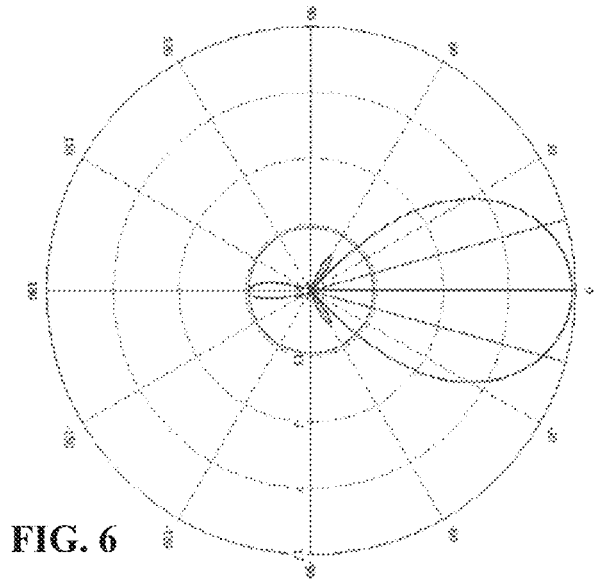
FIG. 6 illustrates a panel antenna vertical pattern in accordance with an example embodiment.

FIG. 6 illustrates a panel antenna vertical pattern. When mounted on an aircraft such that the panel is focused generally perpendicular to the direction of travel, compensation for aircraft rolling maneuvers may be needed. As can be appreciated from FIG. 6, when the in-flight aircraft 330 (which is generally communicating with ATG base stations at and slightly below the horizon) is rolling toward a ground station, the upper portion of the antenna pattern rolls toward the ground station. Meanwhile, when rolling away from the ground station, the antenna pattern provides less gain toward the ground station. Thus, beam steering may be needed (or at least helpful) to focus the antenna gain on the ground station by tilting the antenna assembly to compensate for the aircraft roll. For the panel elements, mechanical or electrical steering may be employed.

Figure 7:
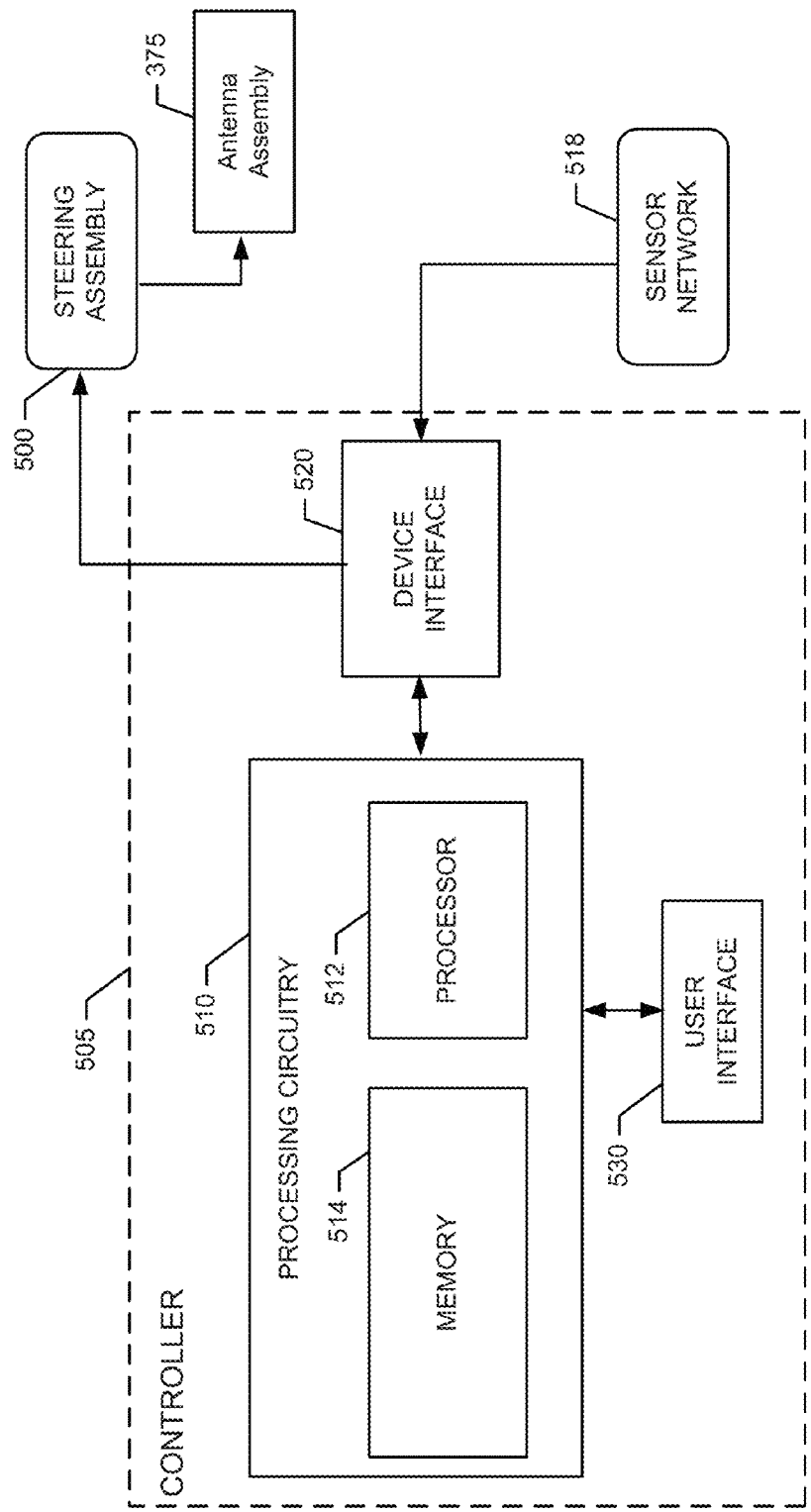
FIG. 7 illustrates a functional block diagram of a controller for selecting antenna elements and compensating for aircraft movement to keep antenna elements oriented toward a focus region in accordance with an example embodiment.

Accordingly, in some embodiments, the antenna assembly 375 may further be in communication with a control element that may be configured to interface with various aircraft sensors to determine the amount of compensation to apply to compensate for aircraft maneuvering. FIG. 7 illustrates a block diagram of components that may be employed for control of antenna assembly components (e.g., the side panels). As shown in FIG. 7, side panel element 400 may be operably coupled to a steering assembly 500. The steering assembly 500 may be configured to mechanically or electrically tilt at least a portion of the antenna assembly 375 (e.g., the side panels (individually or collectively) of the side panel element 400) to maintain the side panels oriented to communicate with ATG base stations proximate to the horizon (e.g., within about 15 degrees below the horizon). A controller 505 may be provided in communication with the steering assembly 500 to provide control over the steering assembly 500. The controller 505 may include processing circuitry 510 configured to provide control outputs for steering of the side panel element 400 based on, for example, knowledge of base station location and the relative position and orientation of the in-flight aircraft 330. The processing circuitry 510 may be configured to perform data processing, control function execution and/or other processing and management services according to an example embodiment of the present invention. In some embodiments, the processing circuitry 510 may be embodied as a chip or chip set. In other words, the processing circuitry 510 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 510 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 510 may include one or more instances of a processor 512 and memory 514 that may be in communication with or otherwise control a device interface 520 and, in some cases, a user interface 530. As such, the processing circuitry 510 may be embodied as a circuit chip (e.g., an integrated circuit chip) configured (e.g., with hardware, software or a combination of hardware and software) to perform operations described herein. However, in some embodiments, the processing circuitry 510 may be embodied as a portion of an on-board computer. In some embodiments, the processing circuitry 510 may communicate with various components, entities and/or sensors of the in-flight aircraft 330. Thus, for example, the processing circuitry 510 may communicate with a sensor network 518 of the in-flight aircraft 330 to receive altitude information, location information (e.g., GPS coordinates, latitude/longitude, etc.), pitch and roll information, and/or the like.

The device interface 520 may include one or more interface mechanisms for enabling communication with other devices (e.g., modules, entities, sensors and/or other components of the in-flight aircraft 330). In some cases, the device interface 520 may be any means such as a device or circuitry embodied in either hardware, or a combination of hardware and software that is configured to receive and/or transmit data from/to modules, entities, sensors and/or other components of the in-flight aircraft 330 that are in communication with the processing circuitry 510.

The processor 512 may be embodied in a number of different ways. For example, the processor 512 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 512 may be configured to execute instructions stored in the memory 514 or otherwise accessible to the processor 512. As such, whether configured by hardware or by a combination of hardware and software, the processor 512 may represent an entity (e.g., physically embodied in circuitry—in the form of processing circuitry 510) capable of performing operations according to embodiments of the present invention while configured accordingly. Thus, for example, when the processor 512 is embodied as an ASIC, FPGA or the like, the processor 512 may be specifically configured hardware for conducting the operations described herein. Alternatively, as another example, when the processor 512 is embodied as an executor of software instructions, the instructions may specifically configure the processor 512 to perform the operations described herein.

In an example embodiment, the processor 512 (or the processing circuitry 510) may be embodied as, include or otherwise control the operation of the steering assembly 500 based on inputs received by the processing circuitry 510 indicative of ATG base station location and/or aircraft maneuvering or position information. As such, in some embodiments, the processor 512 (or the processing circuitry 510) may be said to cause each of the operations described in connection with the steering assembly 500 in relation to adjustments to be made to antenna arrays to undertake the corresponding functionalities relating to array compensation/stabilization based on execution of instructions or algorithms configuring the processor 512 (or processing circuitry 510) accordingly. In particular, the instructions may include instructions for processing 3D position information the in-flight aircraft 330 (including orientation) along with position information of fixed transmission sites in order to instruct an antenna array to tilt or otherwise orient in a direction that will facilitate establishing a communication link between the antenna array and one of the fixed transmission stations.

In an exemplary embodiment, the memory 514 may include one or more non-transitory memory devices such as, for example, volatile and/or non-volatile memory that may be either fixed or removable. The memory 514 may be configured to store information, data, applications, instructions or the like for enabling the processing circuitry 510 to carry out various functions in accordance with exemplary embodiments of the present invention. For example, the memory 514 could be configured to buffer input data for processing by the processor 512. Additionally or alternatively, the memory 514 could be configured to store instructions for execution by the processor 512. As yet another alternative, the memory 514 may include one or more databases that may store a variety of data sets responsive to input sensors and components. Among the contents of the memory 514, applications and/or instructions may be stored for execution by the processor 512 in order to carry out the functionality associated with each respective application/instruction. In some cases, the applications may include instructions for providing inputs to control operation of the steering assembly 500 as described herein. In an example embodiment, the memory 514 may store fixed position information indicative of a fixed geographic location of ATG base stations.

The processing circuitry 510 may also be configured to receive dynamic position information indicative of a three dimensional position and orientation of the in-flight aircraft 330 to compute an adjustment to be applied (if needed) to the orientation of the side panel element 400 based on in-flight aircraft 330 dynamic position. The antenna assembly 375 may therefore be positioned optimally for engaging in continued communication with the corresponding ATG base station currently being used. The antenna assembly 375 can also be optimally positioned to anticipate handover to a next ATG base station based on a predicted future in-flight aircraft 330 location and the known locations of the ATG base stations.

A further embodiment of the aircraft antenna may be as a long blade mounted on the aircraft, with multiple antenna elements within the blade. The multiple elements are employed for beamforming that generally provides a horizon focused beam pattern. However, by using the long blade design, the horizon focused beam pattern can be achieved with a more narrow horizontal (azimuth) pattern (relative to that of the panel antenna) to focus gain toward the desired base station and reduce gain in other interfering directions. The blade results in a wider vertical antenna pattern (relative to the panel antenna), which obviates the need for beam steering in the vertical direction to account for pitch or roll. The more narrow horizontal pattern in combination with the wider vertical pattern delivers a smaller interference profile than the panel antenna, because less interference "surface area" is captured by the antenna pattern. However, the general horizon focus is maintained, and interference from the ground communication layer 320 below the aircraft is substantially avoided.

The network 100 and its corresponding ATG base stations employing the wedge shaped cell architecture described above in reference to FIGS. 1 and 2 may be employed to provide coverage for communication with receivers on aircraft over a very large geographical area, or even an entire country. Moreover, using such architecture may substantially reduce or even minimize the number of ATG base stations that are needed to construct the network 100 since relatively large distances may be provided between ATG base stations. Beamforming techniques (which may also be referred to as beam steering techniques) and frequency reuse may be employed to further improve the ability of the network 100 to provide quality service to multiple targets without interference. Moreover, by providing a movable or steerable antenna array (e.g., antenna array 375) on the in-flight aircraft 330, particularly for an array that is shielded relative to transmissions directly (or nearly directly) below the in-flight aircraft 330 or is otherwise configurable to have less gain anywhere other than near the horizon, both the ATG base stations and the antenna array 375 may be configured to avoid interference below the in-flight aircraft 330. This may permit spectrum reuse of, for example, ISM band frequencies (e.g., 2.4 GHz and/or 5.8 GHz) that may be unlicensed, or even licensed band frequencies at any desirable frequency range.

If airborne interference from ground transmitters such as, for example, ground based WiFi transmitters were relatively low over the entirety of the geographic area to be covered, it could be expected that the wedge architecture of the network 100 of FIGS. 1-2 could provide robust and cost effective coverage without any further modification even though ground transmitters (e.g., terrestrial base stations 300) may use omni-directional antennas that are at least partially oriented to transmit upward using the same frequency.

As mentioned above, the ATG base stations (350 and 355) may employ beamforming (e.g., via a beamforming control module that may employ both 2D knowledge of fixed base station location and 3D knowledge of position information regarding the in-flight aircraft 330 to assist in application of beamforming techniques). Likewise, beamforming and/or beamsteering may be employed on the antenna array 375 of the in-flight aircraft 330 to use knowledge of ATG base station location and aircraft maneuvering (e.g., turns or pitch and roll) to maintain the antenna array 375 in an advantageous orientation to communicate with the ATG base stations when the in-flight aircraft 330 maneuvers. The antenna array 375 may therefore be adjusted in a compensatory manner responsive to maneuvering of the in-flight aircraft 330. The compensation employed may involve switching between antenna elements that are best positioned for the orientation of the aircraft relative to the location of a serving ATG base station and/or tilting of the antenna array 375 to maintain the array in an advantageous position relative to the focus region of the array.

Although not every element of every possible embodiment of the ATG network 100 is shown and described herein, it should be appreciated that the communication equipment on the aircraft 330 may be coupled to one or more of any of a number of different networks through the ATG network 100. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. Example embodiments may employ time division duplex (TDD), frequency division duplex (FDD), or any other suitable mechanisms for enabling two way communication within the system.

As indicated above, a beamforming control module may be employed on wireless communication equipment at either or both of the network side or the aircraft side in example embodiments. Moreover, in some embodiments, the communications received at the aircraft side may be distributed to equipment on the aircraft (e.g., such as telephone handsets or UEs via a WiFi router or other wireless access point, or aircraft communication equipment). In some embodiments, information distributed from the wireless access point may be provided to passenger devices or other aircraft communications equipment with or without intermediate storage.

In an example embodiment, the processing circuitry 510 may be configured to conduct switching to select an antenna element among the antenna assembly for communication with an optimal or otherwise selected one of the ATG base stations. This switching may be performed to select a particular antenna element (or sector) in a panel element or to select between panel elements and/or other antenna elements (e.g., the blade antenna) based on the location of the selected one of the ATG base stations relative to the in-flight aircraft 330. As mentioned above, the switching may be performed using switch devices within the remote radio head 430 or at another location. In some embodiments, the particular antenna element that is selected may additionally or alternatively be tilted electrically or otherwise positionally adjusted to compensate or stabilize the particular antenna element responsive to maneuvering of the in-flight aircraft. Thus, for example, the processing circuitry 510 may initially receive information indicative of dynamic position information of the in-flight aircraft 330, which may include a 3D position and/or orientation information (e.g., pitch and roll) and/or an estimated future position. The processing circuitry 510 may determine an expected relative position of a first network node (e.g., one of the ATG base stations) relative to the aircraft (e.g., based on the fixed position information indicating ATG base station location and the dynamic position information). Tracking algorithms may be employed to track dynamic position changes and/or calculate future positions (relative or geographic) based on current location and rate and direction of movement. After an expected relative position is determined, the processing circuitry 510 may be configured to provide instructions to select an antenna element to communicate with the first network node in the focus region based on the expected relative position. Thereafter, any changes in dynamic position information, particularly related to pitch and roll, may be compensated for by steering of the antenna element (e.g., mechanically or electrically).

Figure 8:
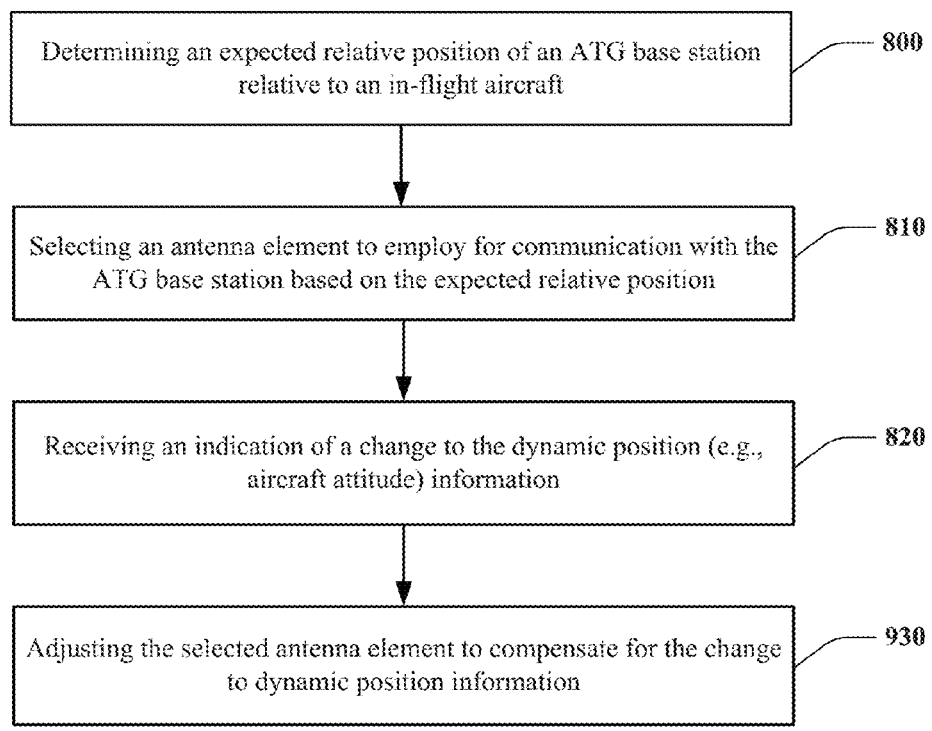
FIG. 8 illustrates a block diagram of a method of communicating in an ATG network in accordance with an example embodiment.

FIG. 8 illustrates a block diagram of one method that may be associated with an example embodiment as described above. From a technical perspective, the processing circuitry 510 described above may be used to support some or all of the operations described in FIG. 8. As such, the platform described in FIG. 7 may be used to facilitate the implementation of several computer program and/or network communication based interactions. As an example, FIG. 8 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the controller 505, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include determining an expected relative position of an ATG base station relative to an in-flight aircraft at operation 800. The expected relative position may be determined based on information indicative of aircraft location and information indicative of the known fixed positions of ATG base stations. However, in some cases, the ATG base station location may be discovered based on detection of a pilot signal or other transmissions from the ATG base station. The method may further include selecting an antenna element to employ for communication with the ATG base station based on the expected relative position at operation 810. The selected antenna element may be an element of an antenna assembly on the aircraft. The antenna assembly may include transmission and receive components, and may include blade antennas, panel antennas and/or the like. Thus, a selected antenna element could be a particular panel antenna or blade antenna, or could be a particular sector of a panel antenna. The selected antenna element could be chosen based on signal strength measured or estimated, or other factors for base stations within a focus region (e.g., horizon to about 15 degrees below the horizon) relative to the aircraft. At operation 820, an indication of a change to the dynamic position information may be received, and the change may be indicative of at least a change in the pitch or roll of the aircraft. The selected antenna element may then be adjusted (e.g., by mechanical or electrical tilting) to compensate for the change to the dynamic position information at operation 830 (e.g., to keep the selected antenna element substantially oriented toward the focus region based on the change to the dynamic position information).

In an example embodiment, the layered approach described above could be augmented to include an additional layer above the ATG communication layer. The layer above the ATG communication layer may be a high altitude service layer. The high altitude service layer may be populated with high altitude service craft such as drones or other devices capable of flying (or orbiting) at high altitude. The high altitude service craft may be in communication with ground stations receiving communication signal from ATG base stations (or satellites) and relaying such communications on to the in-flight aircraft. However, the high altitude service craft with which the in-flight aircraft communicate may be located proximate to the horizon. The communication with high altitude service craft proximate to the horizon allows the same vertical beam steering antennas described above to be employed except the vertical beam steering antennas are steered to maintain the focus area just above the horizon to locate distant high altitude service craft instead of being steered to maintain the focus area just below the horizon. The additional altitude may extend the spacing between service stations (e.g., drones and/or ATG stations) that can be provided to give continuous coverage. Coverage can therefore be provided over sparsely populated areas and/or oceans.

Figure 9:
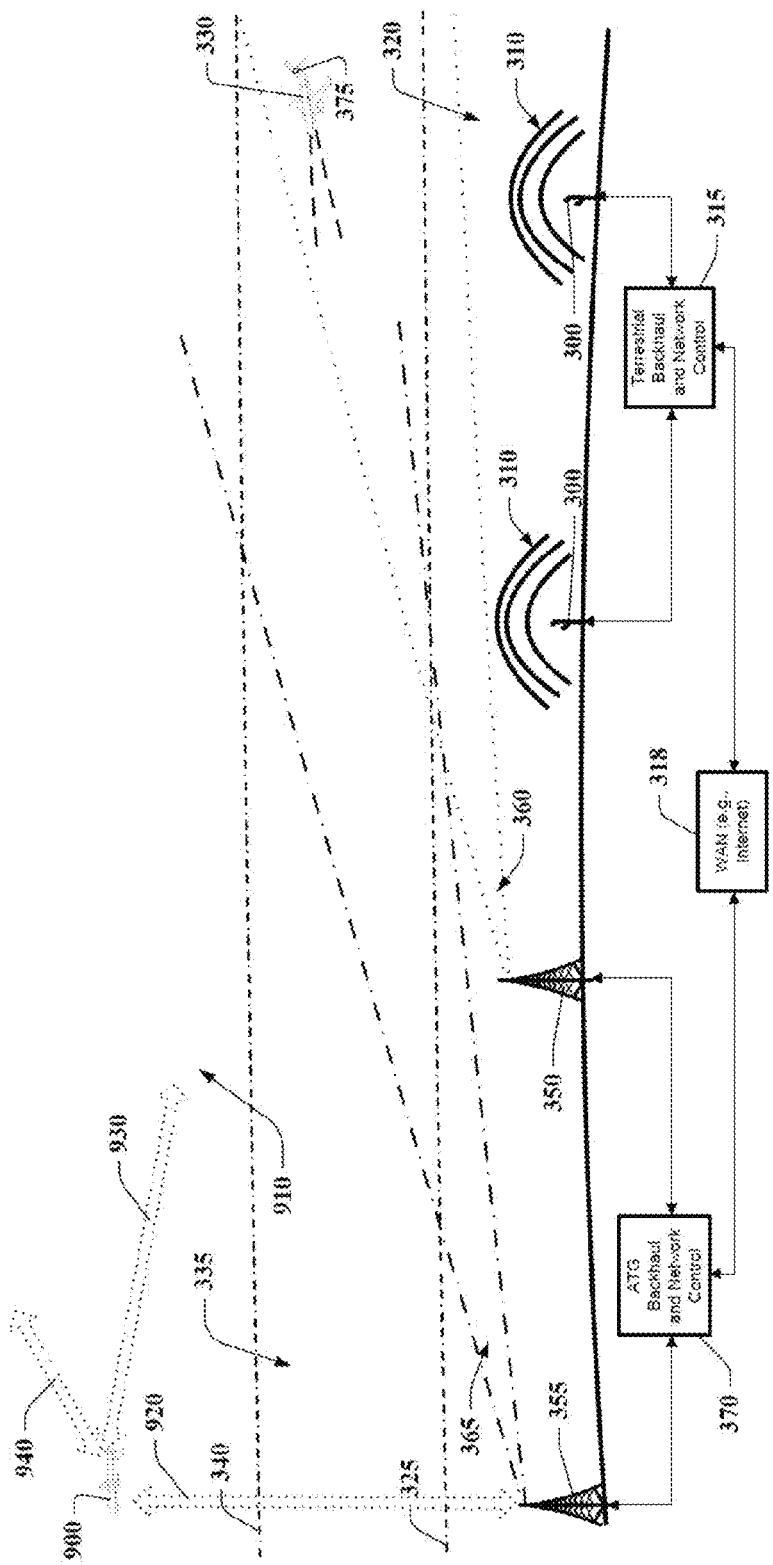
FIG. 9 illustrates a side view of a layered approach to providing wireless communication to in-flight aircraft including a high altitude service layer in accordance with an example embodiment.

As shown in FIG. 9, the network of FIG. 3 may be provided with one or more high altitude service craft 900 in a high altitude service layer 910. The high altitude service layer 910 may extend above the ATG communication layer 335 (e.g., above the predetermined maximum altitude 340) to high altitudes including low earth orbit and beyond. In some examples, drones or balloons acting as high altitude service craft 900 may loiter or otherwise operate as high as (or higher than) 50,000 ft to 75,000 ft. However, it should be noted that the specific example altitudes described herein may change over time as aircraft capabilities change. The high altitude service craft 900 may communicate with the ATG base stations (350 and 355) via an ATG link 920, with the in-flight aircraft 330 via an aircraft link 930 and/or with a satellite via a satellite link 940. Accordingly, the high altitude service craft 900 may be enabled to service the in-flight aircraft 330 over vast distances and in different communication environments.

Accordingly, uninterrupted handover of receivers on the in-flight aircraft 330 may be provided while passing between coverage areas of ATG base stations and high altitude service craft having overlapping coverage areas as described herein. When employed in a network that includes a high altitude service layer 910, the antenna assembly 375 may be configured to focus energy in an area from the horizon to about 10 or 15 degrees above the horizon (from the perspective of the in-flight aircraft 330) to communicate with the high altitude service craft 900. Moreover, the antenna assembly 375 can be vertically steered to shift between being serviced by ATG base stations or high altitude service craft based on signal strength or other such factors in association with a handover managed between the ATG base stations and high altitude service craft (or vice versa). The high altitude service craft 900 may also include antennas focused toward the horizon (e.g., focusing energy in an area from the horizon to about 10 or 15 degrees below the horizon (from the perspective of the high altitude service craft 900) and the service craft antenna assembly may also be vertically steerable to account for turning or banking of the high altitude service craft 900 in similar fashion to the way the antenna assembly 375 of the in-flight aircraft 330 is steerable (as described above). Thus, the high altitude service craft 900 may also use horizon-focused antenna assemblies for communication with aircraft, other drones and/or with the ground. Moreover, the same frequencies can be used for each of these links, and it may also be the same frequency used in the ground communication layer 320 given that the beams for such communication are steerable (e.g., employing spatial filtering and vertical beamsteering) to extend substantially parallel to the surface of the earth and avoid interference with communications in the ground communication layer 320. In some cases, however, the high altitude service craft 900 may use a first frequency to communicate to aircraft and ground stations, and the aircraft (where it does not use high altitude service craft 900 for connectivity) may use a second frequency to communicate from the aircraft to ground and ground to ground.

The employment of the high altitude service layer 910 may effectively create a sandwich mesh architecture. High altitude service craft 900 may link to other high altitude service craft to provide a GB/s wireless backhaul network that may only selectively touch or access ground stations or satellites in a handful of places. The high altitude service craft 900 may therefore generally be above the weather and connections to the ground may be selectively made in areas that have good weather to minimize negative impacts of weather on communications at higher frequencies, whether RF or optical. Furthermore, at high altitudes, physics may enable ready use of free space optics or high frequency RF to further enhance network performance. Meanwhile, the antenna assembly 375 of the in-flight aircraft 330 is steerable+/−10 to 15 degrees from the horizon to selectively communicate with the ATG base stations (350 and 355), with other in-flight aircraft 330 and/or with the high altitude service craft 900.

As an alternative to the architecture of FIG. 5, in which separate receive and transmit elements are provided, some embodiments may employ a single steerable antenna element (or panel) that handles both transmit and receive functions by employing duplexing. By employing an antenna element that can handle both transmit and receive functions, the size, weight, number and cost of antenna elements employed may be reduced. Maximal ratio combining may also be employed. With employment of full duplexing, receiver filtering becomes important to allow signals to be differentiated. BAW filters, in-line cavity filters or a BAW duplexer may therefore be employed. A BAW duplexer may be a relatively straightforward option for such a full duplex solution.

Figure 10:
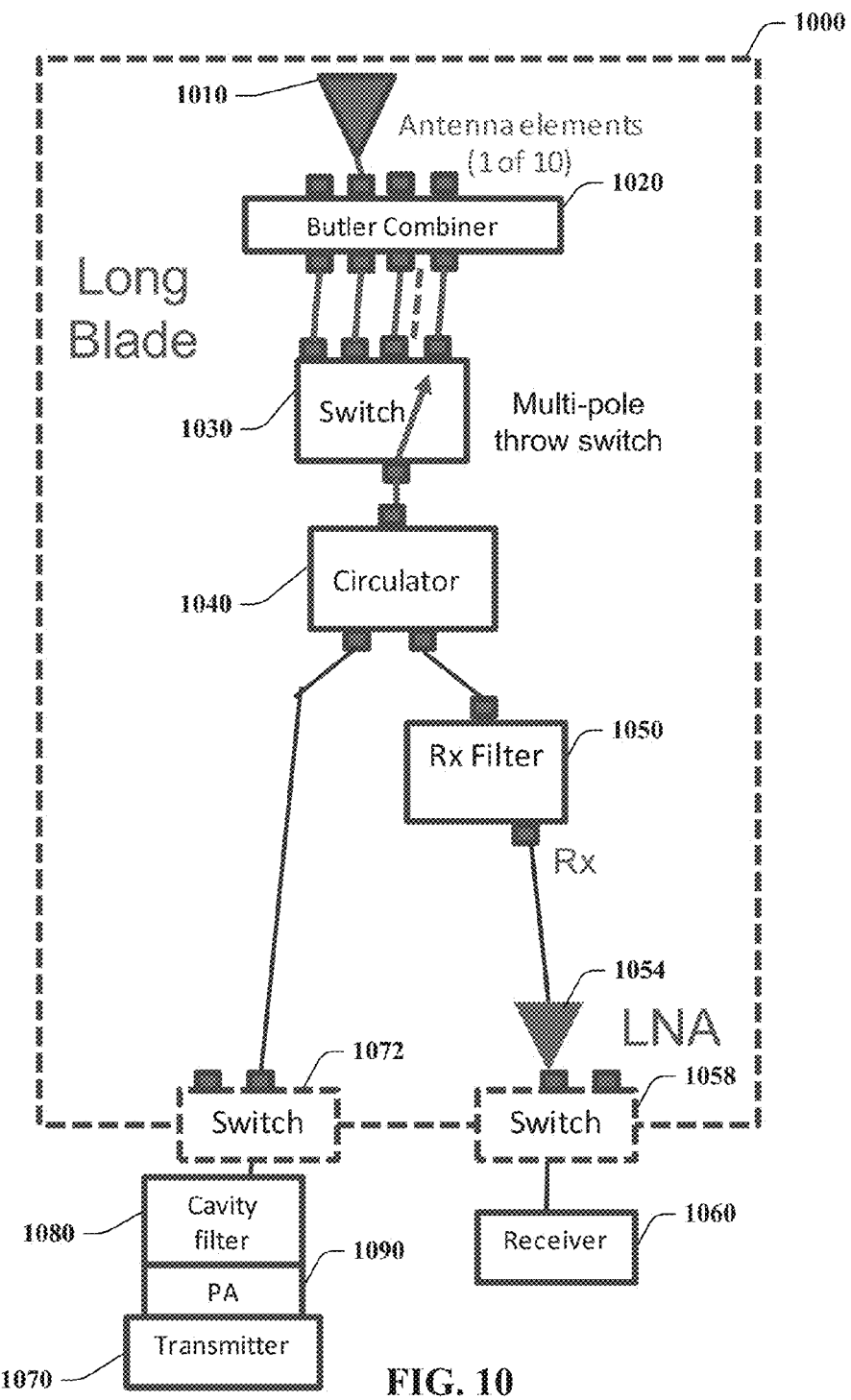
FIG. 10 illustrates a full duplex radio architecture in accordance with a first example.

FIG. 10 illustrates a full duplex radio architecture in accordance with a first option. In this regard, FIG. 10 shows an architecture for a relatively long blade antenna 1000 that may be provided in some embodiments. The antenna 1000 may include one or more elements 1010 (e.g., 10 in some cases) that may provide signals to a Butler combiner 1020, which may be operably coupled to a multi-pole throw switch 1030 (e.g., a ten pole switch). The switch 1030 may be operably coupled to a circulator 1040. The circulator 1040 may isolate signals among ports so that signals on port 1 go to port 2, signals on port 2 go to port 3, etc. The circulator 1040 may provide as much as 18 dB of isolation port-to-port with a relatively low insertion loss of 0.6 dB. The circulator 1040 may be operably coupled to a receive filter 1050 and ultimately to receiver circuitry 1060 via a low noise amplifier (LNA) 1054 and a switch 1058. In this architecture, the receive filter 1050 is in front of the LNA 1054 for enhanced receiver overload protection (e.g., for a transmit signal level at the LNA input of −34 dBm, overall noise figure may be 7.9 dB). The circulator 1040 is also operably coupled to transmitter circuitry 1070 through a switch 1072, a cavity filter 1080 and a power amplifier 1090.

Figure 11:
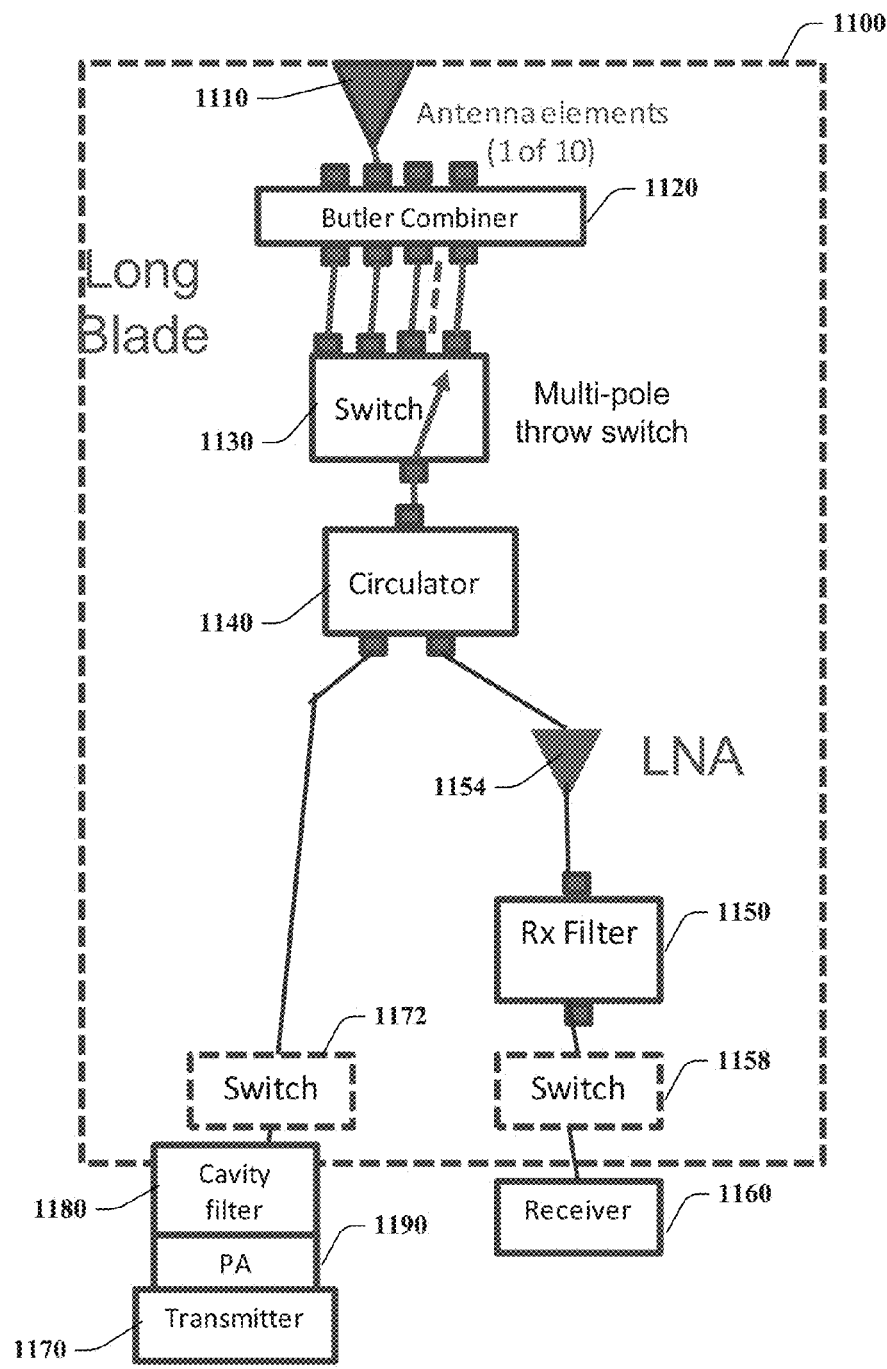
FIG. 11 illustrates a full duplex radio architecture in accordance with a second option.

FIG. 11 illustrates a full duplex radio architecture in accordance with a second option. In this regard, FIG. 11 shows an architecture for a relatively long blade antenna 1100 that may be provided in some embodiments. The antenna 1100 may include one or more elements 1110 (e.g., 10 in some cases) that may provide signals to a Butler combiner 1120, which may be operably coupled to a multipole throw switch 1130 (e.g., a ten pole switch). The switch 1130 may be operably coupled to a circulator 1140. The circulator 1140 may isolate signals among ports so that signals on port 1 go to port 2, signals on port 2 go to port 3, etc. The circulator 1140 may provide as much as 18 dB of isolation port-to-port with a relatively low insertion loss of 0.6 dB, as described above. However, in this example, an LNA 1154 is provided prior to a receive filter 1150. The receive filter 1150 is then operably coupled to the receiver circuitry 1160 via switch 1158. In this architecture, the receive filter 1150 is behind the LNA 1154 for reduced noise figure, but higher transmit signal level at the LNA 1154 (e.g., for a transmit signal level at the LNA input of +6 dBm, overall noise figure may be 6.1 dB). The circulator 1140 is also operably coupled to transmitter circuitry 1170 through a switch 1172, a cavity filter 1180 and a power amplifier 1190. In some alternative embodiments, either the architecture of FIG. 10 or the architecture of FIG. 11 could be duplicated with two duplexer elements replacing the circulators of each respective figure for an alternative approach.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An air-to-ground (ATG) network providing wireless communication to an in-flight aircraft capable of passing through various cells of the ATG network, the ATG network comprising:
   a first ATG base station defining a first radiation pattern focusing energy toward the horizon;
   a second ATG base station defining a second radiation pattern focusing energy toward the horizon; and
   a plurality of additional ATG base stations, each of which defines a corresponding radiation pattern focusing energy toward the horizon,
   wherein the first, second and additional ATG base stations are spaced apart from each other to define at least partially overlapping coverage areas to communicate with an antenna assembly on the in-flight aircraft in an ATG communication layer defined between a first altitude and a second altitude via the ATG network,
   wherein a plurality of terrestrial base stations are configured to communicate primarily in a ground communication layer below the first altitude via a terrestrial communication network, and
   wherein the first, second and additional ATG base stations are each configured to communicate in the ATG communication layer using the same radio frequency (RF) spectrum used by the terrestrial base stations in the ground communication layer.

2. The ATG network of claim 1, wherein a serving ATG base station from among the first, second and additional ATG base stations is in communication with the in-flight aircraft while being geographically located outside a coverage area of each of the terrestrial base stations in a portion of the ground communication layer above which the in-flight aircraft is located.

3. The ATG network of claim 1, further comprising a high altitude service layer disposed above the second altitude.

4. The ATG network of claim 3, wherein a high altitude service craft is disposed above the second altitude to support wireless communication with at least one asset outside the high altitude service layer.

5. The ATG network of claim 4, wherein the at least one asset comprises the in-flight aircraft in the ATG communication layer.

6. The ATG network of claim 4, wherein the at least one asset comprises a selected one of the first, second or additional ATG base stations.

7. The ATG network of claim 3, wherein a high altitude service craft is disposed above the second altitude to support wireless communication with a satellite.

8. The ATG network of claim 3, wherein a high altitude service craft is disposed above the second altitude to form an aircraft link with the in-flight aircraft in the ATG communication layer and a satellite link to a satellite.

9. The ATG network of claim 8, wherein the high altitude service craft forms an ATG link with a selected one of the first, second or additional ATG base stations.

10. The ATG network of claim 3, wherein a high altitude service craft is disposed above the second altitude to form an ATG link with a selected one of the first, second or additional ATG base stations and an aircraft link with the in-flight aircraft in the ATG communication layer.

11. The ATG network of claim 10, wherein the high altitude service craft forms a satellite link to a satellite.

12. A system for supporting air-to-ground (ATG) wireless communication in various cells, the system comprising:
- an in-flight aircraft including an antenna assembly;
- a plurality of ATG base stations, each of which defines a corresponding radiation pattern focusing energy toward the horizon, wherein the base stations are spaced apart from each other to define at least partially overlapping coverage areas to communicate with the antenna assembly in an ATG communication layer defined between a first altitude and a second altitude via an ATG communication network;
- a high altitude service craft disposed in a high altitude service layer above the second altitude; and
- a plurality of terrestrial base stations configured to communicate primarily in a ground communication layer below the first altitude via a terrestrial communication network;
- wherein the terrestrial base stations and the ATG base stations are each configured to communicate using the same radio frequency (RF) spectrum in the ground communication layer and ATG communication layer, respectively.

13. The system of claim 12, wherein a serving ATG base station from among the plurality of ATG base stations is in communication with the in-flight aircraft while being geographically located outside a coverage area of each of the terrestrial base stations in a portion of the ground communication layer above which the in-flight aircraft is located.

14. The system of claim 13, the high altitude service craft supports wireless communication with at least one asset outside the high altitude service layer.

15. The system of claim 14, wherein the at least one asset comprises the in-flight aircraft in the ATG communication layer.

16. The system of claim 14, wherein the at least one asset comprises a selected one of the first, second or additional ATG base stations.

17. The system of claim 13, wherein the high altitude service craft is disposed above the second altitude to support wireless communication with a satellite.

18. The system of claim 13, wherein the high altitude service craft is disposed above the second altitude to form an aircraft link with the in-flight aircraft in the ATG communication layer and a satellite link to a satellite.

19. The system of claim 18, wherein the high altitude service craft forms an ATG link with a selected one of the plurality of ATG base stations.

* * * * *